United States Patent

[11] 3,578,007

| [72] | Inventor | William W. Blake<br>Wyoming, Ill. |
|---|---|---|
| [21] | Appl. No. | 883,839 |
| [22] | Filed | Dec. 10, 1969 |
| [45] | Patented | May 11, 1971 |
| [73] | Assignee | Caterpillar Tractor Co.<br>Peoria, Ill. |

[54] DELAYED GOVERNOR CUTOFF VALVE
3 Claims, 1 Drawing Fig.

[52] U.S. Cl. ............................................. 137/51,
74/752(C), 137/54, 137/625.18, 251/53
[51] Int. Cl. ....................................................... G05d 13/66
[50] Field of Search ............................................ 137/51, 54,
625.18; 74/752 (C)

[56] References Cited
UNITED STATES PATENTS
3,452,621 7/1969 Golan et al. ................. 74/752(C)

*Primary Examiner*—Robert G. Nilson
*Attorney*—Fryer, Tjensvold, Feix, Phillips & Lempio

ABSTRACT: A delayed governor cutoff valve system is provided in a transmission control system for temporarily blocking hydraulic pressure signals which are normally transmitted from a governor to a group of automatic transmission shift selector valves. By blocking off the governor from the automatic shift selector valves the governor is prevented from sending erroneous pressure signals to the selector valves during certain phases of the transmission shifting cycle.

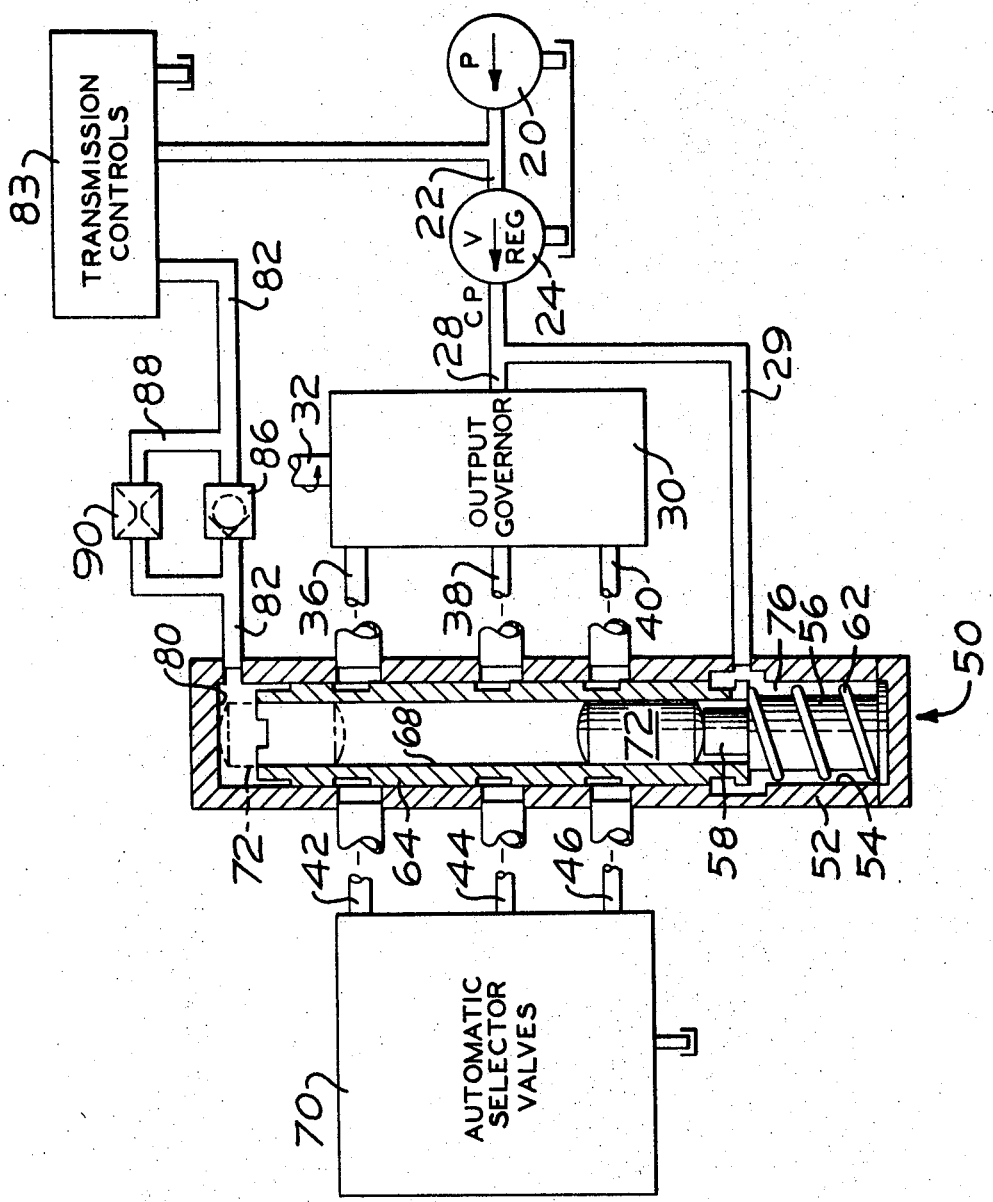

DELAYED GOVERNOR CUTOFF VALVE

BACKGROUND OF THE INVENTION

Automatic transmission control systems frequently employ a centrifugal force-operated hydraulic governor for supplying pressure signals to a group of automatic selector valves which control the shifting cycle of a vehicle. One of the problems with such systems is that during a shift from one speed ratio to another, certain transient pressure oscillations (due to changes in torque, backlash or windup in the gear train, etc.) may, on occasion, be communicated through the governor to the automatic selector valves.

The transmission of these erroneous signals to the automatic selector valves can cause the transmission to upshift or downshift erroneously and this causes excessive wear on the transmission components, clutches, etc. This condition of erroneous shifting is sometimes referred to by those skilled in the art as "transmission hunting."

The present invention has as a principle object the prevention of this unwanted transmission hunting and provides a novel, delayed governor cutoff valve system which blocks fluid communication between the governor and the automatic selector valves during certain shift periods and provides sufficient time for damping of component fluctuations to a steady rate to thereby eliminate transmission hunting.

Other and further objects and advantages of the present invention will be apparent from the following description and claims and are illustrated in the accompanying drawing which, by way of illustration, shows preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING

The drawing is a schematic view of the delayed governor cutoff valve system wherein certain components of the system are shown in cross section.

DETAILED DESCRIPTION OF THE PREFERRED EMBODIMENT

Referring to the drawing, a fluid pressure source is provided in the form of a pump 20 which is driven by either the transmission input or output shaft (not shown). The pump 20 operates to supply pressure fluid of a value of at least 125 p.s.i. through a conduit 22 and then to a constant pressure outlet valve 24. The constant pressure outlet valve 24 reduces the fluid pressure to a given value, for example 96 p.s.i., and transmits this constant fluid pressure to a pair of conduits 28 and 29.

The conduit 28 communicates the substantially constant fluid pressure to an output governor 30. The governor 30 produces a plurality of independent fluid pressure signals in direct proportion to the output speed of the power transmission unit. The rotational output speed of the transmission unit is communicated to the governor by means of a shaft 32.

The details of the output governor are not the subject of the instant application and it is sufficient to understand that the governor contains three centrifugal force-operated pressure reducing valves which provide three separate hydraulic signals which are in direct proportion to the aforementioned output speed and upon which the various shift points of the system depend.

The three hydraulic pressure signals from the governor are communicated through conduits 36, 38 and 40 to a governor cutoff valve assembly generally shown at 50. The specific structural details of the governor cutoff valve 50 will be described in greater detail at a later point in the specification. At this juncture it is sufficient to understand that the governor cutoff valve is normally open and the three hydraulic pressure signals transmitted from the governor are communicated to a group of automatic selector valves 70 via conduits 42, 44 and 46.

Although not shown, the selector valves 70 are divided into three groups which sense pressure from the output governor 30 by way of the three conduits 42, 44 and 46. The automatic selector valves are arranged in series as is well known in the art and are responsive to the governor pressure signals communicated through the conduits 42, 44 and 46 to provide for automatic shifting of the transmission when the proper shift points are reached.

The governor cutoff valve 50 comprises a housing 52 which is provided with a longitudinal bore 54. The lower end of the bore 54 is provided with a fixed stop member 56 which has a reduced diameter portion 58 at its upper end. A coil spring 62 surrounds the stop element 56 and exerts an upward force on a movable spool 64 which is slidably received within the housing bore 54.

The spool 64 is provided with a longitudinal bore 68 and a slug element 72 is slidably received within the spool bore 68. During certain phases of the operation of the valve 50, the slug 72 may move to the position shown in dotted line at the upper end of the valve bore 54.

However, the slug 72 normally rests upon the reduced diameter portion 58 of the stop element 56. Likewise, the valve spool 64 normally assumes the position shown in the drawing during which time the governor pressure signals are communicated from the governor 30 through the valve 50 and then to the automatic selector valves 70.

The governor cutoff valve 50 is provided with a lower chamber 76 which is at all times supplied with a constant fluid pressure via the conduit 29. It should be noted that the constant fluid pressure maintained in the chamber 76 is also exerted on the valve spool 64 and tends to move the valve spool upwardly in the valve bore 54.

When the valve spool 64 does move upwardly under the pressure of spring 62 and the pressure fluid in chamber 76, the valve spool blocks communication between the conduits 36, 38 and 40 and the respective conduits 42, 44 and 46. Thus, when the spool 64 is moved to its upper position no governor pressure signals are transmitted through the valve 50 to the automatic selector valves 70 and consequently shifting of the transmission is temporarily halted.

The governor cutoff valve is also provided with an upper chamber 80 which is in fluid communication with a conduit 82 leading to the transmission controls 83. Under normal operating conditions the fluid pressure in conduit 82 and hence in upper chamber 80, exceeds the constant fluid pressure of 96 p.s.i. in the lower chamber 76. Consequently, the valve spool 64 is normally biased downwardly to the open position shown in the drawing.

A one-way check valve 86 is provided in conduit 82 and this check valve is normally closed so that pressure fluid in conduit 82 is shunted through a branch conduit 88. The conduit 88 is provided with a reduced diameter flow orifice 90 to restrict the volume of fluid passing between upper chamber 80 and the transmission controls 83 during certain phases of the operating cycle.

When a shift is initiated certain transmission clutches (not shown) disengage to effect an interruption of engine torque to the drive wheels which allows the vehicle to decelerate. During this time, the drive train can experience both positive and negative torque which in turn imposes a similar influence on the governor drive shaft 32. The above factors plus the inertia component of the governor and backlash in the gear train (not shown) may on occasion cause the governor 30 to supply false signals through the conduits 36, 38 and 40 leading to the automatic selector valves 70. It is the combined function of cutoff valve 50, check valve 86 and flow orifice 90 to prevent the transfer of any such erroneous governor pressure signals to the automatic selector valves 70.

In the transient period during a shift the fluid pressure in conduit 82 leading to the transmission controls drops. This pressure drop in conduit 82 corresponds to the reduced clutch fill pressure in the newly engaging clutches. When the fluid pressure in conduit 82 drops, the check valve 86 opens and the fluid pressure in upper chamber 80 also drops as this fluid is supplied to the transmission controls 83.

At this juncture the constant fluid pressure in lower chamber 76 and the force of spring 62 serve to rapidly move the valve spool 64 upwardly thereby discharging more fluid from upper chamber 80 to the transmission controls 83. The upward movement of spool 64 blocks pressure signals from the governor 30 to the automatic selector valves 70 thus preventing any unwanted shifts during this transient period.

The constant pressure in lower chamber 76 also forces the slug 72 to move upwardly toward the dotted line position in the drawing. Upward movement of the slug 72 causes even more fluid to be discharged from upper chamber 80 to the transmission controls 83.

After the engaging clutches are filled, fluid pressure in conduit 82 again increases to a normal level which is higher than that in lower chamber 76. The one-way check valve 86 closes and orifice 90 meters high-pressure fluid to upper chamber 80 which causes the slug 72 to begin to move downwardly.

This downward movement of the slug provides a delay period prior to downward movement of the spool 64 so that if the pressure in conduit 36, 38, 40 should suddenly drop again no erroneous pressure signal has been transmitted from the governor to the automatic selector valves. After the slug 72 abuts the upper portion 58 of the stop 56, the spool 64 overcomes the pressure of spring 62 and moves downwardly. When the spool moves downwardly the governor 30 once again directs pressure signals to the automatic selector valves.

While I have illustrated and described preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A delayed governor cutoff valve system for use in connection with a hydraulic control system for a multiple speed ratio power transmission, said hydraulic control system comprising, a source of fluid pressure; first valve means for providing a constant fluid pressure from the source to first and second conduits; hydraulic governor means in fluid communication with the first conduit and operably connected to a transmission output member for producing a plurality of hydraulic governor pressure signals that are functionally related in magnitude to the speed of the output member; a plurality of automatic selector valves in fluid communication with the governor; each automatic selector valve operable upon receiving a pressure signal from the governor to select and initiate a different speed ratio change; said delayed governor cutoff valve system comprising, a cutoff valve interposed between the governor and the automatic selector valves; said valve having a housing defining a longitudinal bore; a spool assembly slidably received in the housing bore and movable to a first position to permit fluid communication between the governor and the automatic selector valves and movable to a second position to block communication between the governor and the automatic selector valves; a first end of the housing bore defining a first chamber in fluid communication with the second conduit so that a first end of the cutoff valve spool is subjected to the constant fluid pressure supplied through the second conduit; a second end of the housing bore defining a second chamber receiving a second end of the cutoff valve spool; third conduit means interconnecting the second chamber with a transmission control assembly; a normally closed one-way check valve in the third conduit; a fourth conduit straddled about the one-way check valve and having flow restricting means therein; said transmission control assembly normally supplying pressure fluid through the third and fourth conduits at a pressure value which is higher than the constant fluid pressure in the first chamber of the cutoff valve so that the cutoff valve spool is normally biased to an open position which permits fluid communication between the governor and the automatic selector valves; said delayed governor cutoff valve system operable in response to a drop in fluid pressure in the third conduit below the constant fluid pressure in the second conduit to cause the one-way check valve to open and the cutoff valve spool to move to a closed position which blocks fluid communication between the governor and the automatic selector valves until such time as the pressure in the third conduit exceeds the constant fluid pressure in the second conduit.

2. A delayed governor cutoff valve system as set forth in claim 1 wherein the cutoff valve spool is provided with a longitudinal bore and a movable slug is slidably received in the spool bore and normally rests upon a stop member located in the first end of the spool bore; said slug operable to move toward the second end of the spool bore under the fluid pressure of the second conduit when the pressure in the third conduit drops below the pressure in the second conduit.

3. A delayed governor cutoff valve system as set forth in claim 2 and further comprising spring means in the first valve chamber for biasing the cutoff valve spool toward the second valve chamber.